(12) United States Patent
Liljenstolpe

(10) Patent No.: US 11,290,284 B2
(45) Date of Patent: *Mar. 29, 2022

(54) POLICY CONTROLLED CRYPTOGRAPHY

(71) Applicant: Tigera, Inc., San Francisco, CA (US)

(72) Inventor: Christopher David Liljenstolpe, San Francisco, CA (US)

(73) Assignee: Tigera, Inc., San Francisco, CA (US)

( * ) Notice: Subject to any disclaimer, the term of this patent is extended or adjusted under 35 U.S.C. 154(b) by 32 days.

This patent is subject to a terminal disclaimer.

(21) Appl. No.: 16/717,893

(22) Filed: Dec. 17, 2019

(65) Prior Publication Data

US 2020/0127852 A1 Apr. 23, 2020

Related U.S. Application Data

(63) Continuation of application No. 15/664,313, filed on Jul. 31, 2017, now Pat. No. 10,547,456.

(60) Provisional application No. 62/448,327, filed on Jan. 19, 2017.

(51) Int. Cl.
*H04L 9/32* (2006.01)
*H04L 9/14* (2006.01)
*H04L 9/00* (2022.01)
*H04L 9/30* (2006.01)
*H04L 67/1004* (2022.01)
*H04L 67/56* (2022.01)

(52) U.S. Cl.
CPC .......... *H04L 9/3263* (2013.01); *H04L 9/006* (2013.01); *H04L 9/14* (2013.01); *H04L 9/30* (2013.01); *H04L 9/3247* (2013.01); *H04L 67/1004* (2013.01); *H04L 67/28* (2013.01)

(58) Field of Classification Search
CPC .............................. H04L 9/3263; H04L 9/006
USPC .......................................................... 713/156
See application file for complete search history.

(56) References Cited

U.S. PATENT DOCUMENTS

| 9,154,479 | B1 | 10/2015 | Sethi | |
|---|---|---|---|---|
| 9,953,075 | B1 | 4/2018 | Reiner | |
| 2005/0204041 | A1* | 9/2005 | Blinn | ...................... H04L 63/08 709/225 |
| 2010/0275241 | A1 | 10/2010 | Srinivasan | |
| 2011/0047590 | A1 | 2/2011 | Carr | |
| 2012/0054368 | A1 | 3/2012 | Brown | |
| 2012/0185913 | A1 | 7/2012 | Martinez | |
| 2013/0019018 | A1 | 1/2013 | Rice | |
| 2013/0086631 | A1 | 4/2013 | Archer | |
| 2014/0351573 | A1 | 11/2014 | Martini | |
| 2015/0163158 | A1 | 6/2015 | Ryland | |
| 2015/0188910 | A1* | 7/2015 | Tsai | ...................... H04L 63/205 713/175 |
| 2016/0248685 | A1 | 8/2016 | Pignataro | |

(Continued)

*Primary Examiner* — Anthony D Brown
(74) *Attorney, Agent, or Firm* — Van Pelt, Yi & James LLP

(57) ABSTRACT

One or more data packets intended for a workload running on the server are received from an endpoint at a proxy associated with a server. The proxy associated with the server determines whether the one or more data packets intended for the workload are encrypted with a certificate associated with a policy group that includes the workload. The one or more data packets are provided to the workload based on whether the one or more data packets intended for the workload are encrypted with a certificate associated with a policy group that includes the workload.

20 Claims, 14 Drawing Sheets

(56) References Cited

U.S. PATENT DOCUMENTS

2017/0034161 A1 2/2017 Rahul
2018/0027060 A1 1/2018 Metsch

* cited by examiner

POLICY CONTROLLED CRYPTOGRAPHY

CROSS REFERENCE TO OTHER APPLICATIONS

This application is a continuation of co-pending U.S. patent application Ser. No. 15/664,313, entitled POLICY CONTROLLED CRYPTOGRAPHY filed Jul. 31, 2017 which is incorporated herein by reference for all purposes, which claims priority to U.S. Provisional Patent Application No. 62/448,327 entitled POLICY CONTROLLED SERVICE ROUTING AND CRYPTOGRAPHY filed Jan. 19, 2017 which is incorporated herein by reference for all purposes.

BACKGROUND OF THE INVENTION

A computing environment can be comprised of one or more servers, each server running one or more workloads (e.g., containers, pods, virtual machines, executable code, uni-kernels, etc.). The workloads can communicate with one or more endpoints external to a server. The manner in which traffic is controlled between a workload and an endpoint is typically workload-specific. Traffic can be load balanced, blocked, encrypted, etc. In a computing environment comprised of hundreds, even thousands of workloads, it can be very time consuming to modify the encryption control mechanisms associated with each individual workload.

BRIEF DESCRIPTION OF THE DRAWINGS

Various embodiments of the invention are disclosed in the following detailed description and the accompanying drawings.

DETAILED DESCRIPTION

Figure 1:
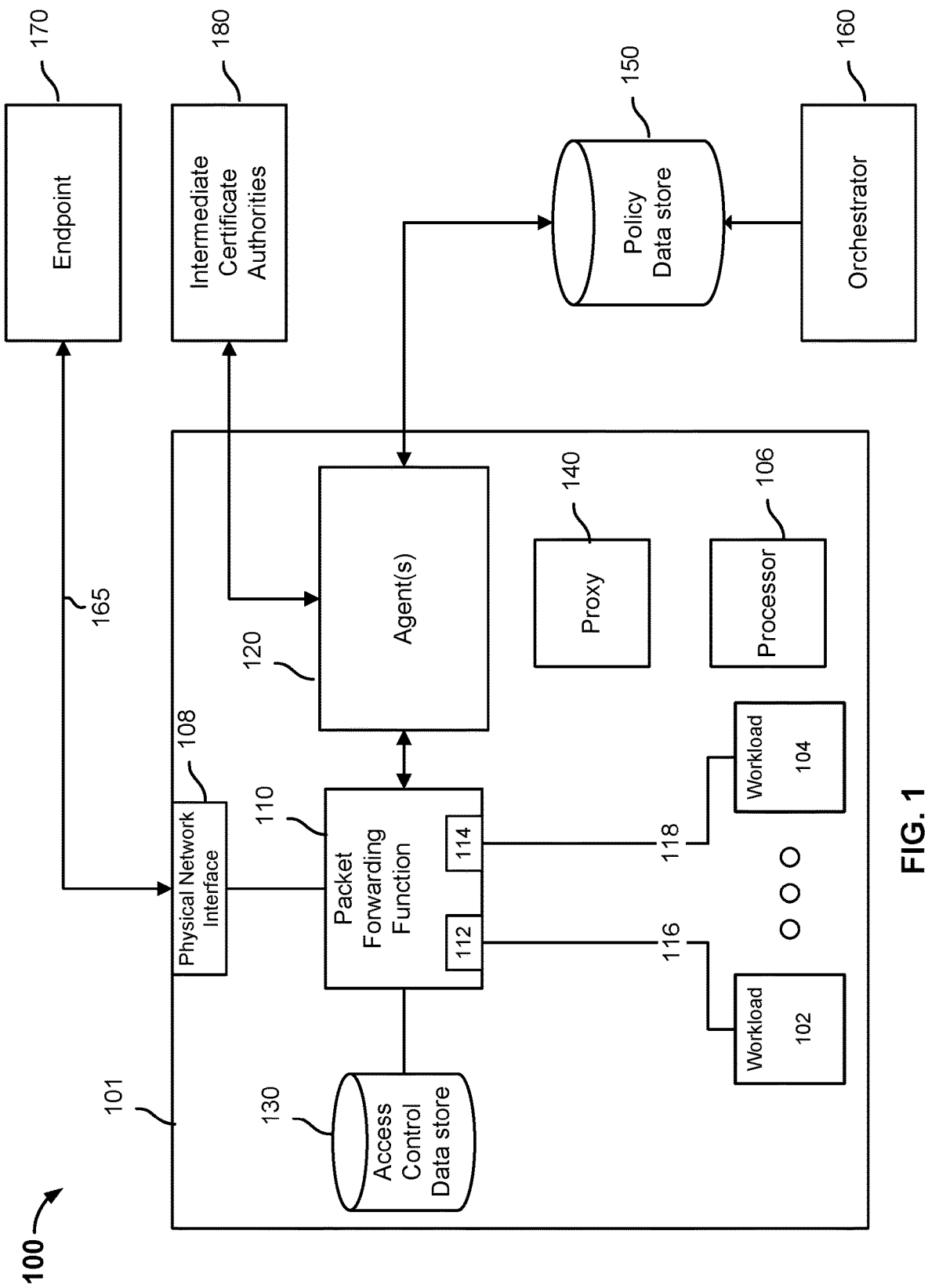
FIG. 1 is a block diagram illustrating an embodiment of a system for policy controlled service routing encryption.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Policy-controlled service routing encryption is disclosed. A workload can be instantiated on a server and an orchestrator can attach metadata to the workload. A workload can be associated with a consumer or provider of a service. The metadata attached to a workload can be associated with one or more policies. Such policies control the behavior and access of the workload within a computing environment.

A workload can have different roles. Each role can be associated with the one or more policies. A workload role and its associated policies is considered to be a policy group (PG). Thus, a workload can be associated with one or more PGs. A PG can be associated with one or more workloads, so long as the workloads include the necessary metadata attached to each workload.

A workload can communicate with one or more endpoints external or internal to the server. In some instances, a policy of a PG may indicate that the traffic between a workload of the PG and an endpoint must be encrypted. An intermediate certificate authority (iCA) is then generated for the PG that is specific to that PG.

An agent running on the server on which the workload is instantiated can inspect the metadata attached to the workload and retrieve from a policy data store the one or more policies associated with the metadata attached to the workload. The agent can inspect the one or more policies and determine that one of the policies requires traffic to be encrypted with a certificate signed by an iCA associated with a particular PG. The agent can generate a certificate and send the certificate to an iCA associated with the particular PG. The iCA can sign the certificate and send the signed certificate to the agent. The agent can install the signed certificate in a proxy associated with the workload.

A PG can require that traffic from a workload is to be encrypted using a certificate signed by an iCA associated with the PG and installed in a routing proxy associated with the workload. A PG can require that traffic to a workload is to be encrypted with a certificate that is directly or indirectly signed by the iCA associated with the PG. In the event the traffic is not encrypted with a certificate that is directly or indirectly signed by the iCA associated with the PG, the traffic could be dropped or otherwise acted upon (e.g., captured, modified, examined, passed with a warning indicator, etc.). Policy-group-based encryption not only allows two-way encryption to be performed and prevents untrusted data packets from reaching a particular workload, but also provides an efficient mechanism to control cryptographic communications associated with a workload.

FIG. 1 is a block diagram illustrating an embodiment of a system for policy controlled service routing encryption. The system 100 includes a server 101, a policy data store 150, an orchestrator 160, an endpoint 170, and one or more intermediate certificate authorities 180.

Server 101 is comprised of one or more workloads 102, 104, a processor 106, a physical network interface 108, a packet forwarding function 110, one or more agents 120, an access control datastore 130, and one or more proxies 140. Server 101 can be a hardware module comprised within a server in a data center network (e.g., blade server or other hardware component). Server 101 can include one or more workloads 102, 104. A workload can be a container, a pod, a virtual machine, executable code, a uni-kernel, etc. A workload can be associated with metadata (e.g., tag(s), label(s), key-value pair(s), etc.) that is attached to it by an orchestrator/scheduler or via other mechanisms. For example, a workload can have a label, such as "red" or "blue," or have a key-value pair (KVP), such as "role: production" or "role: development." In other embodiments, a workload can have other tags, labels, and/or key-value pairs. The metadata associated with a workload follows the workload around the cloud as the workload is instantiated, moved, destroyed, scaled up, and/or scaled down.

The metadata associated with a workload can be referenced by one or more policies. A policy can reflect an intent of how one or more associated workloads are to be used within a computing environment. For example, a policy can indicate that workloads with a "red" label and a KVP of "role: production" can access a "red_db" server, whereas workloads with a "blue" label and a KVP of "role: production" are not be able to access the "red_db" server, but are able to access a "blue_db" server.

A set of policies can be considered to be a PG. A workload may have different roles, each role associated with a different PG. For example, a workload may have a first role as a login client and a second role as a dB server. The login client role may have a first set of one or more policies to which it is associated and the dB server role may have a second set of one or more policies associated to which it is associated. The first set of one or more policies can be considered to be a first PG and the second set of one or more policies can be considered to be a second PG. In some embodiments, at least one of the policies from the first set is also a policy in the second set.

Server 101 can include a processor or processing system 106. The processing system can be comprised of one or more processors and/or memory. Server 101 can include a physical network interface 108. In some embodiments, physical network interface 108 is configured to receive one or more data packets from one or more endpoints 170 and to forward the one or more data packets to packet forwarding function 110. In other embodiments, physical network interface 108 is configured to forward one or more data packets received from packet forwarding function 110 to one of the one or more endpoints 170. Physical network interface 108 can be comprised of one or more network interface cards.

Server 101 can include a packet forwarding function 110, which is configured to forward data packets that may be routed to and/or from the one or more workloads 102, 104. In some embodiments, packet forwarding function 110 forwards packets from workload 102 to workload 104 and vice versa. In other embodiments, packet forwarding function 110 forwards packets from workloads 102, 104 to one or more endpoints 170. In other embodiments, packet forwarding function 110 forwards packets from one or more endpoints 170 to workloads 102, 104.

Packet forwarding function 110 can be comprised of one or more virtual interfaces 112, 114, with a respective virtual connection 116, 118 connecting a respective workload 102, 104 to packet forwarding function 110. In some embodiments, packet forwarding function 110 is comprised within a Linux kernel running on server 101. In some embodiments, virtual interfaces 112, 114 can comprise a virtual Ethernet port, a network tunnel (tun), or a network tunnel (tap).

Server 101 can include one or more agents 120. In some embodiments, an agent can be configured to analyze the metadata associated with a workload and to retrieve from policy data store 150 one or more policies associated with the metadata. In other embodiments, an agent can be configured to determine one or more endpoints associated with a policy. For example, a policy can indicate that a workload with a "red" label is permitted to communicate with server with a "red_db" label. An agent can receive a list of servers associated with a "red_db" label from policy data store 150 and update an access control list (ACL) stored in access control data store 130 to reflect the one or more servers with a "red_db" label with which a workload with a "red" label is permitted to communicate.

In other embodiments, an agent can be configured to receive an indication from policy data store 150 when an update occurs to any of the policies stored in policy data store 150. In response to receiving an update from policy data store 150, an agent can be configured to make corresponding updates to the ACL. For example, a policy can be updated to change a role associated with workloads with a "red" label from "development" to "production." The policy may indicate that a workload with a "red" label and a "development" role can communicate with a server with a "red_db_dev" label and may indicate that a workload with a "red" label and a "production" role can communicate with a server with a "red_db_prod" label. An agent can be configured to update the ACL such that the workload with a "red" label and new "production" role is able to communicate with a server with a "red_db_prod" label instead of a server with a "red_db_dev" label.

In other embodiments, an agent can be configured to receive an indication that a workload is no longer in service. In response, an agent can be configured to update the ACL by removing entries associated with the workload that is no longer in service (e.g., server with "red" label is permitted to communicate with servers with "red_db" label.).

In some embodiments, an agent is configured to inspect the one or more policies associated with a workload and determine one or more PGs associated with the one or more policies. The agent can determine whether a PG requires that traffic between the workload and a particular endpoint be encrypted. In the event that it is determined that a PG requires that traffic between the workload and the particular endpoint be encrypted, the agent can generate a certificate specific to that PG and to transmit the certificate to an iCA associated with the PG. For example, a workload can be associated with a first PG and a second PG. The agent is configured to send a first certificate to the iCA associated with the first PG and a second certificate to the iCA associated with the second PG. Upon receiving a signed certificate from an iCA, the agent can install the signed certificate in a proxy associated with the server, or, more specifically, with the workload, such that traffic from the workload to an endpoint associated with the PG, is encrypted using the signed certificate associated with the PG.

Server 101 can include an access control data store 130. Access control data store 130 can comprise an ACL that includes entries of IP addresses that are allowed to communicate with a particular workload and entries of IP addresses to which the particular workload is allowed to communicate.

The IP addresses can be explicitly or implicitly specified by one or more policies. For example, a policy may indicate that a workload with a "red" label and a KVP of "role: production" can access a "red_db" server. The ACL can be updated to store the IP addresses of all servers associated with a "red_db" label. This will allow the workload with the "red" label and a KVP of "role: production" to access any of the "red_db" servers with an IP address stored in the ACL. In some embodiments, a policy can indicate a specific port for traffic from a workload to an endpoint. For example, a policy can indicate that a workload with a "red" label and a KVP of "role: production" can access a "red_db" server via port 631. In other embodiments, a policy can indicate that a workload with a particular label can receive traffic via a specific port. For example, a policy can indicate that workloads with a "blue" label can receive incoming traffic via port 8080.

The policy may also refer to the contents of the packet instead of, or in conjunction with, the IP address and port combination. For example, a PG could require that encryption be used to encrypt HTTP POST messages, but not HTTP GET messages.

Access control data store 130 can comprise an ACL that includes entries of API endpoints that are allowed to communicate with a particular workload and entries of API endpoints to which the particular workload is allowed to communicate.

In some embodiments, access control data store 130 is updated on a periodic basis. In other embodiments, access control data store 130 is updated by an agent upon the agent detecting a change to one of the policies stored in policy data store 150 or to a policy group. In other embodiments, an agent is configured to subscribe to policy data store updates and to update the access control data store 130.

Server 100 can include one or more proxies 140. A proxy can be configured to enforce a policy associated with one or more workloads. A proxy can be a sidecar proxy—actually included as part of the workload, an external proxy dedicated to a specific workload, or a shared proxy for a plurality of workloads. In other embodiments, the proxy can be a remote proxy located on a different host. In other embodiments, the proxy can be located in a workload. In other embodiments, the proxy can be proxy located in packet forwarding function 110 (e.g., Linux kernel, user space daemon). In some embodiments, a policy can indicate that traffic between a workload and an endpoint is to travel through a proxy. In other embodiments, a policy can indicate that traffic between a workload and an endpoint does not need to travel through a proxy.

In some embodiments, a proxy can be configured to encrypt traffic from a workload associated with a PG to an endpoint using a certificate signed by an iCA associated with the PG.

An endpoint can be associated with a PG. In other embodiments, a proxy can be configured to inspect traffic received from an endpoint and directed to a workload associated with a particular PG. The proxy can determine whether the traffic is encrypted using a certificate that was directly signed by an iCA associated with the particular PG or indirectly signed by the iCA associated with the particular PG. In the event the traffic is encrypted using a certificate that was signed by the iCA associated with the particular PG (i.e., directly signed by the iCA associated with the particular PG), then the proxy can permit the traffic from the endpoint to pass on to the workload.

An iCA may be part of a chain of intermediate certificate authorities that ends at a root certificate authority. In some embodiments, in the event traffic is encrypted using a certificate that was signed by an iCA that is part of the chain of intermediate certificate authorities associated with the particular PG or signed by the root certificate authority associated with the particular PG (i.e., indirectly signed by the iCA associated with the PG), then the proxy can permit the traffic from the endpoint to pass on to the workload. In some embodiments, in the event traffic is not encrypted using a certificate that was signed by an iCA that is part of the chain of intermediate certificate authorities associated with the particular PG or signed by the root certificate authority associated with the particular PG, then the proxy does not permit the traffic from the endpoint to pass on to the workload, i.e., the traffic is dropped.

Server 100 can be coupled to policy data store 150. Policy data store 150 can be configured to store a plurality of policies. A policy can be associated with one or more workloads. A workload can be associated with one or more different policies.

In some embodiments, policy data store 150 can store one or more policies associated with load balancing. For example, a policy can mutate the load-balancing algorithm to change the weights, priorities, destinations, and/or other load-balancing characteristics. In some embodiments, a policy can require that specific traffic can be load-balanced while other traffic is not load-balanced. For example, traffic associated with workloads having a "red" label can be load-balanced while traffic associated with workloads having a "blue" label is not load-balanced. A policy can also change the interpretation of delivery of feedback information that load-balancing mechanisms used to access the performance of the infrastructure.

In some embodiments, policy data store 150 can store one or more policies associated with application delivery control. A policy can limit which workloads can access which services based on destination, API endpoint, or other information encoded within a request or attempted application access. For example, a policy may indicate that only workloads tagged 'role:production' are allowed to "POST" to a specific set of URLs on a production database. A policy can also apply similar controls to traffic destined for workloads from external or foreign endpoints. A policy can also rewrite and/or modify or mutate the network traffic based on policy requirements. For example, during a change of an API, calls using a legacy form of the API might be re-written into the current form, based on policy requirements. A policy may be used to change an API call or destination to allow for policy-driven access control or 'Red/Blue' testing.

In some embodiments, policy data store 150 can store one or more policies associated with transport and/or session cryptography. For example, a policy can require that traffic between certain end-points and certain workloads are encrypted, either at the transport or session level. A policy can also dictate which certificates and/or keys are used for which sessions between certain endpoints and certain workloads. A policy can also only allow traffic that has been encrypted in a manner specified by the policy. A policy can require certain rules for traffic from a workload to an endpoint and different rules for traffic from the endpoint to the workload. A policy can indicate that traffic is to be re-directed to a particular enforcement agent.

Policy data store 150 can be accessible by the one or more proxies 140. A proxy can be configured to subscribe to a change to the one or more policies stored in policy data store 150. For example, a workload may be removed from a PG (e.g., a workload is no longer part of a development PG.) In response to the workload being removed from the PG, the signed certificates associated with the PG are no longer valid for the workload. This prevents workloads from communicating with endpoints to which it is no longer permitted to communicate. For example, a workload may be part of a development PG and be permitted to send data packets to "dev_db_server" and vice versa. The development PG may require that traffic between the workload and the "dev_db_server" be encrypted with a certificate signed by an iCA associated with the development PG. Upon a workload being removed from the development PG, a proxy will no longer encrypt traffic sent from the workload to the "dev_db_server" with the certificate signed by an iCA associated with the development PG and the traffic will be dropped. Also, upon being removed from the development PG, the endpoint will no longer be permitted to send traffic to the workload, even though the traffic is encrypted with a certificate that was directly or indirectly signed by the iCA associated with the development PG.

Policy data store 150 can be accessible to one or more other proxies that are part of one or more other servers. The one or more other proxies can be configured to subscribe to updates to policy data store 150. For example, in the event a workload is removed from a PG, the one or more other proxies can be configured to receive such an update and adjust one or more rules associated with the workload.

Policy data store 150 can be coupled to orchestrator 160. In some embodiments, orchestrator 160 can be configured to setup the one or more workloads 102, 104 on server 101. Orchestrator 160 can assign an IP address to a workload when setting up the workload.

In some embodiments, orchestrator 160 can be configured to attach metadata to a workload. The metadata can be a tag, label, key-value pair, etc. For example, a workload can have a label, such as "red" or "blue," or have a key-value pair, such as "role: production" or "role: development." In some embodiments, orchestrator 160 can be configured to update any of the one or more policies stored in policy data store 150. For example, a policy may indicate that workloads with a role label of "production" are able to communicate with one or more servers with a "production" label. Some of the workloads with a role label of "production" may behave in a manner that is different than the expected behavior. Orchestrator 160 can modify a policy associated with workloads with a role label of "production" such that workloads with a role label of "production" are no longer able to communicate with one or more servers with a "production" label. In some embodiments, orchestrator 160 is configured to modify the one or more functions enumerated in a policy (e.g., post, get, put, patch, delete, etc.) that workloads with a particular set of metadata are able to perform with respect to an endpoint. By attaching certain metadata to a workload, orchestrator 160 can assign a workload to a particular PG since the metadata is associated with one or more policies, such that the associated one or more policies may be a PG.

In other embodiments, orchestrator 160 is configured to modify the metadata that is attached to a workload. For example, a label of a workload can be changed from "red" to "blue." In some embodiments, orchestrator 160 is configured communicate with policy data store via a plugin (e.g, translation mechanism such as a neutron worker (in Open-Stack) or CNI plugin (in the container networking interface model)). By modifying the metadata that is attached to a workload, orchestrator 160 can remove a workload from a PG since a workload may no longer include metadata that is associated with a policy of the PG.

In some embodiments, orchestrator 160 can be configured to close any of the one or more workloads 102, 104 on server 101 and to update any of the policies associated with the closed workloads. For example, a policy may be updated to indicate that a workload is no longer permitted to communicate with a particular endpoint.

In some embodiments, orchestrator 160 can be configured to create a PG comprised of one or more policies and to generate an iCA associated with the PG.

The server is also coupled to endpoint 170 via network connection 165. Network connection 165 can be a local area network, a wide area network, a wired network, a wireless network, the Internet, an intranet, or any other appropriate communication network. Endpoint 170 can be a database server, an API server, or any other type of server external to server 101. Endpoint 170 can receive traffic from server 101 and also can send traffic to server 101.

Server 101 can be coupled to one or more intermediate certificate authorities 180. A iCA can be created for each PG. An iCA is configured to receive a certificate from an agent and to sign the certificate. An iCA is configured to receive traffic from an endpoint associated with a PG and to encrypt the traffic using a signed certificate associated with the PG.

Figure 2:
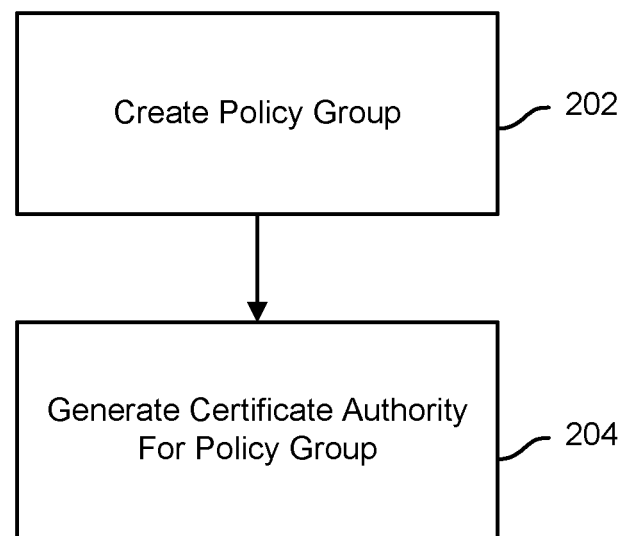
FIG. 2 is a flowchart illustrating an embodiment of a process for generating an intermediate certificate authority.

FIG. 2 is a flowchart illustrating an embodiment of a process for generating an intermediate certificate authority. In the example shown, process 200 can be performed by an orchestrator, such as orchestrator 160.

At 202, a PG is created. A PG is comprised of one or more policies. The PG can require that traffic associated the PG be encrypted.

At 204, an iCA for the PG is generated. An iCA can be created for each PG created by an orchestrator. The iCA is configured to receive a certificate from an agent and to sign the certificate if the certificate is for a workload having a set of policies associated with the PG with which the iCA is associated. An iCA can be configured to receive traffic from an endpoint associated with a PG and to encrypt the traffic using a signed certificate associated with the PG.

Figure 3:
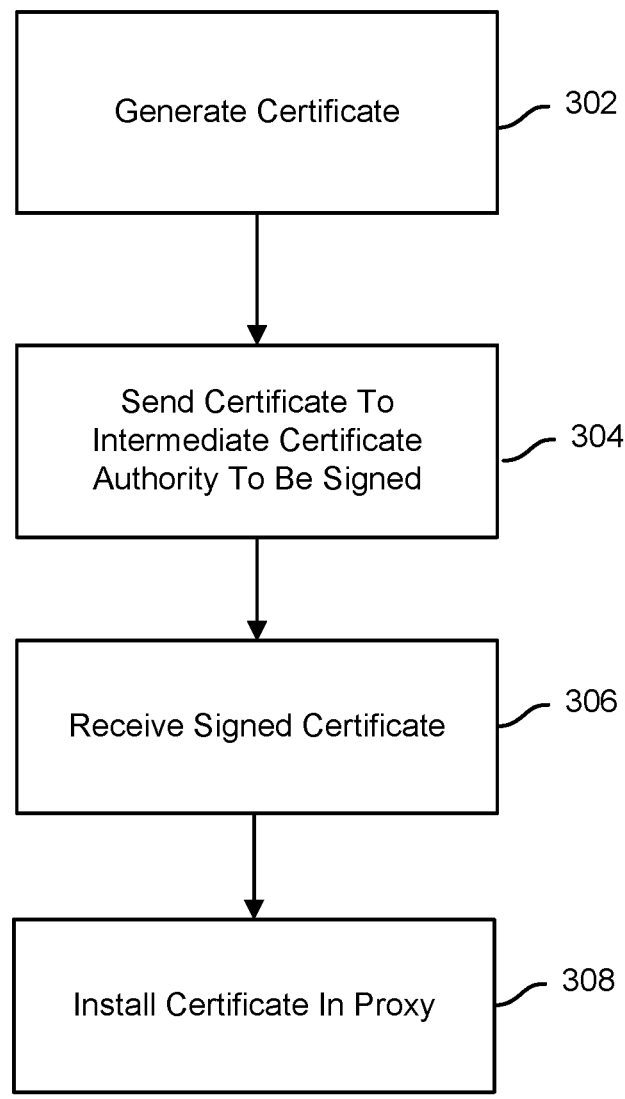
FIG. 3 is a flowchart illustrating an embodiment of a process for installing a certificate in a proxy.

FIG. 3 is a flowchart illustrating an embodiment of a process for installing a certificate in a proxy. In the example shown, process 300 can be performed by an agent, such as one of the one or more agents 120.

At 302, a certificate is generated. An agent can inspect metadata attached to a workload and determine one or more policies associated with the metadata. The agent can determine that the one or more policies are part of one or more PGs. A certificate can be generated for each determined PG.

At 304, the certificate is sent to an iCA associated with the PG to be signed. For example, a workload can be associated with a first PG and a second PG. The agent can be configured to send a first certificate to the iCA associated with the first PG and a second certificate to the iCA associated with the second PG.

At 306, a signed certificate associated with the PG is received from the iCA. At 308, the signed certificate is installed in the proxy. Upon being installed in the proxy, traffic from a workload that is associated with the PG can be encrypted using the signed certificate.

Figure 4:
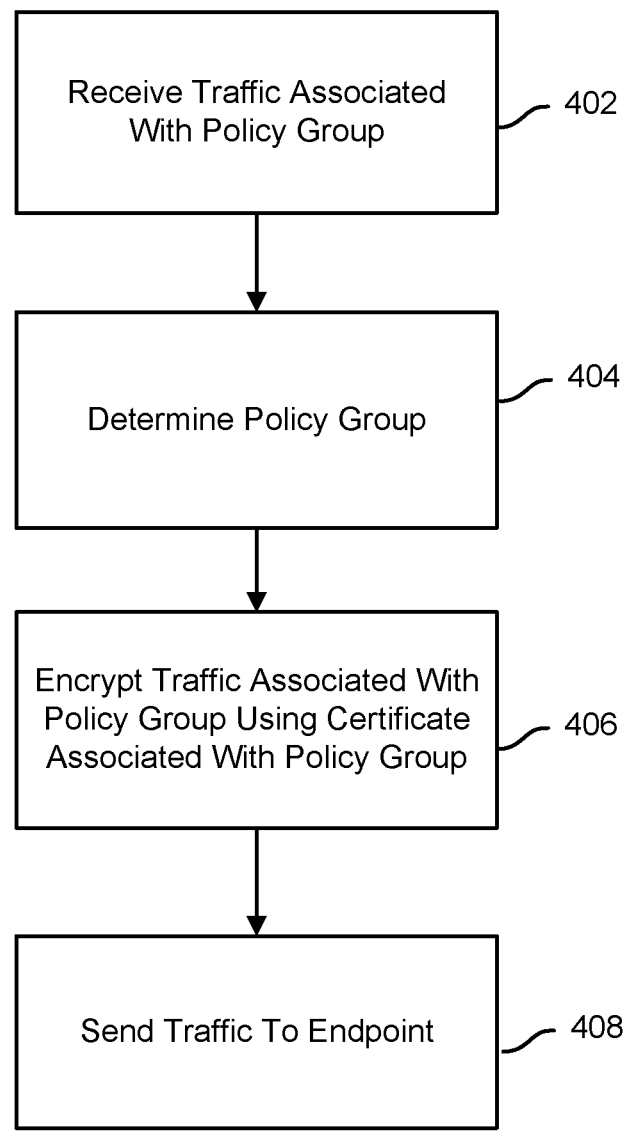
FIG. 4 is a flowchart illustrating an embodiment of a process for routing traffic from a workload.

FIG. 4 is a flowchart illustrating an embodiment of a process for routing traffic from a workload. In the example shown, process 400 can be performed by a proxy, such as one of the one or more proxies 140.

At 402, traffic is received from a workload. For example, traffic from a workload with a "red" label and a key-value pair of "role: production" may be received at the proxy. The "red" label may be associated with a first set of one or more policies and the key-value pair of "role: production" may be associated with a second set of one or more policies. The first set, the second set, or a combination of the first set and the second set may be a different policy groups.

At 404, a PG associated with the workload is determined. In some embodiments, the policy can be determined based on the metadata attached to the workload. In other embodiments, the PGs associated with the workload are stored in an ACL and a lookup is performed to determine the PG with which a workload is associated. In other embodiments, the PG can be determined based on a destination of the traffic. In other embodiments, the PG can be determined by any policy match at L3 through L7.

At 406, the traffic associated with a PG is encrypted using a certificate associated with the PG. For example, traffic from a workload with a "red" label and a key-value pair of "role: production" may be encrypted using a certificate signed by an iCA associated the PG of workloads with a "red" label and a key-value pair of "role: production."

At 408, the traffic is sent to an endpoint. For example, an endpoint can be a database server, an API server, or any other type of server external to a workload.

Figure 5:
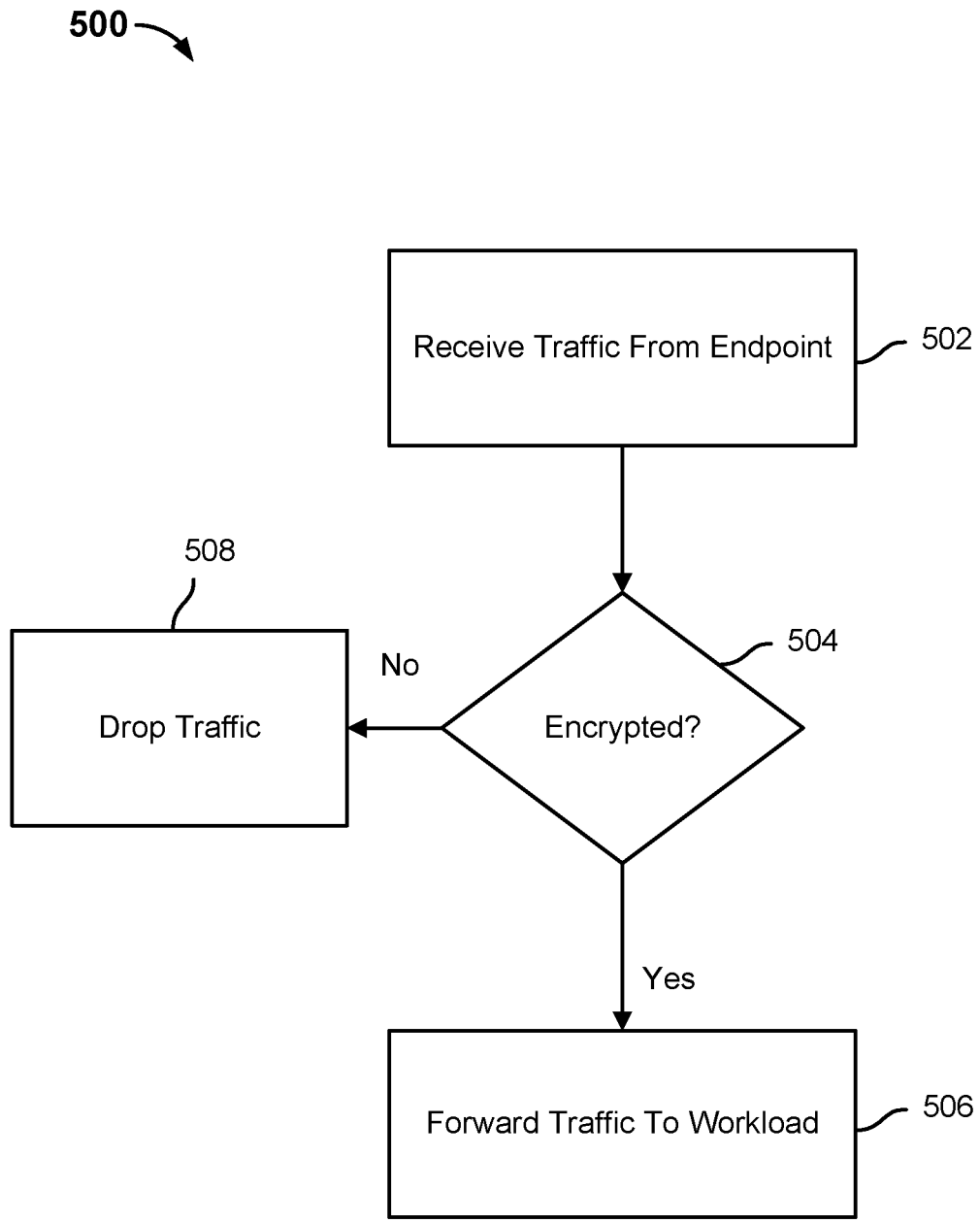
FIG. 5 is a flowchart illustrating an embodiment of a process for routing traffic to a workload.

FIG. 5 is a flowchart illustrating an embodiment of a process for routing traffic to a workload. In the example shown, process 500 can be performed by a proxy, such as one of the proxies 140.

At 502, traffic directed to a workload is received from an endpoint. For example, an endpoint can be a database server, an API server, or any other type of server external to a workload.

At 504, it is determined if the traffic is encrypted with a certificate that was directly signed by an iCA associated with a PG that includes the workload or indirectly signed by the iCA associated with the PG that includes the workload. In some embodiments, in the event the traffic is encrypted using a certificate that was signed by the iCA associated with the PG that includes the workload, then the process proceeds to 506 and the proxy can permit the traffic from the endpoint to pass on to the workload. An iCA may be part of a chain of intermediate certificate authorities that ends at a root certificate authority. In some embodiments, in the event traffic is encrypted using a certificate that was signed by an iCA associated with the PG that includes the workload and the iCA is part of the chain of intermediate certificate authorities associated with the PG or the certificate was signed by the root certificate authority of the iCA associated with the PG that includes the workload (i.e., indirectly signed by the iCA associated with the PG), then the process proceeds to 506 and the proxy can permit the traffic from the endpoint to pass on to the workload.

In the event the traffic is not encrypted using a certificate that was signed by an iCA that is part of the chain of intermediate certificate authorities associated with the PG that includes the workload or signed by the root certificate authority associated with the PG that includes the workload, then process proceeds to 508 and the proxy does not permit the traffic from the endpoint to pass on to the workload, i.e., the traffic is dropped. For example, the proxy may receive an invalid certificate or a certificate directly or indirectly signed by an iCA associated with a different PG.

Figure 6:
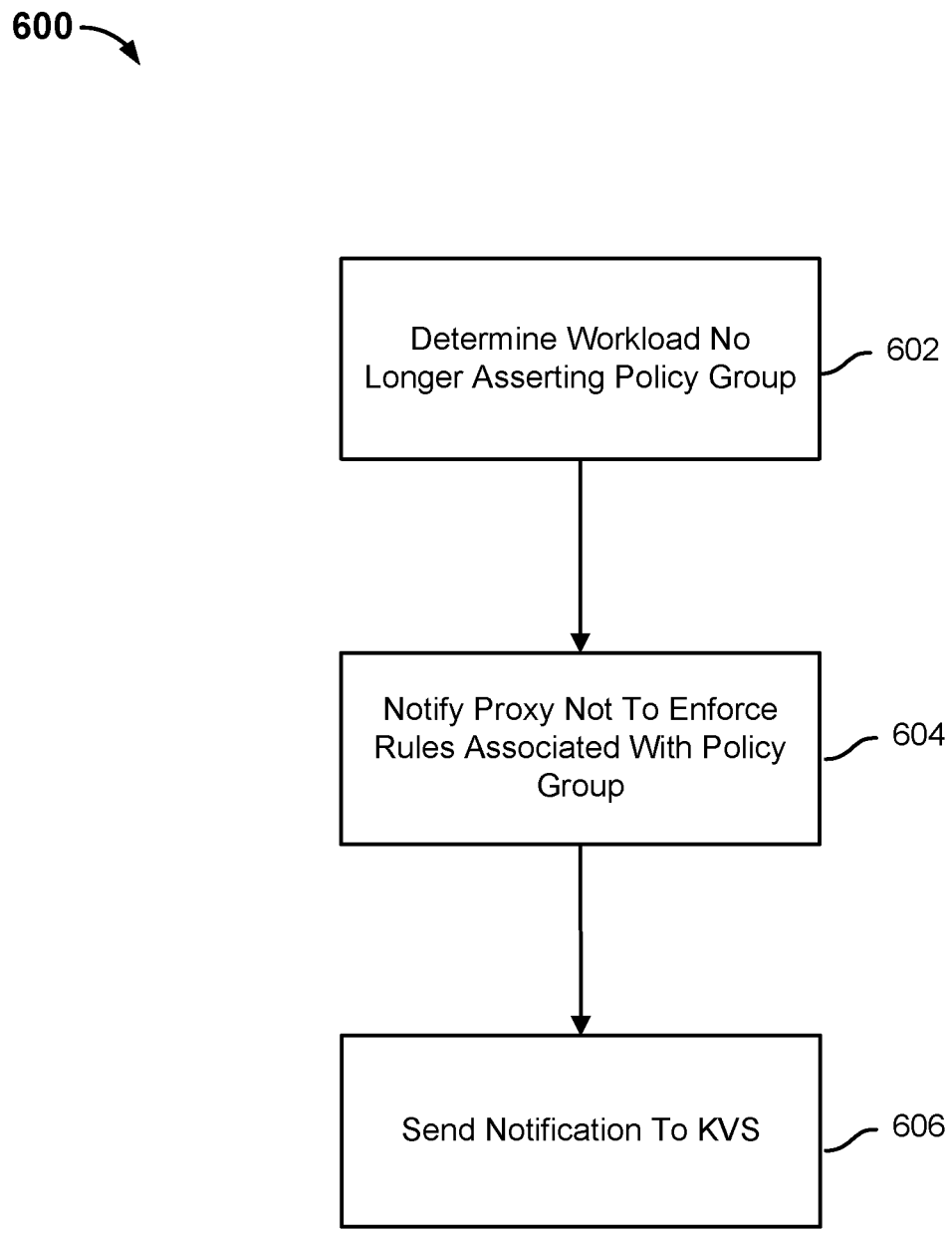
FIG. 6 is a flowchart illustrating an embodiment of a process for updating proxy rules associated with a policy group.

FIG. 6 is a flowchart illustrating an embodiment of a process for updating proxy rules associated with a policy group. In the example shown, process 600 can be performed by an agent, such as one of the one or more agents 120.

At 602, it is determined that a PG is no longer valid for a particular workload. In some embodiments, an agent determines that the metadata attached to a workload has changed such that the workload is no longer part of a PG. In other embodiments, an agent can subscribe to one or more changes to a policy stored in a policy data store. In some embodiments, an agent can determine that a PG is no longer valid for a particular workload because the policy group no longer exists in the policy data store. In other embodiments, an agent can determine that a PG is no longer valid for a particular workload because a policy has been added to the set of policies associated with the PG and the particular workload does not have metadata associated with the added policy.

At 604, a proxy is notified not to enforce rules associated with PG. A particular PG may require traffic between a workload and an endpoint to be encrypted using a certificate signed by an iCA associated with the PG. Traffic from a particular workload may not be encrypted and as a result, prevented from being forwarded to the endpoint.

At 606, a notification is sent to a policy data store. The notification can include an indication that the certificate signed by the iCA associated with the PG is no longer valid. Other proxies may be configured to subscribe to changes in the policy data store. Upon receiving the notification, the other proxies can remove the rules associated with the PG.

Figure 7:
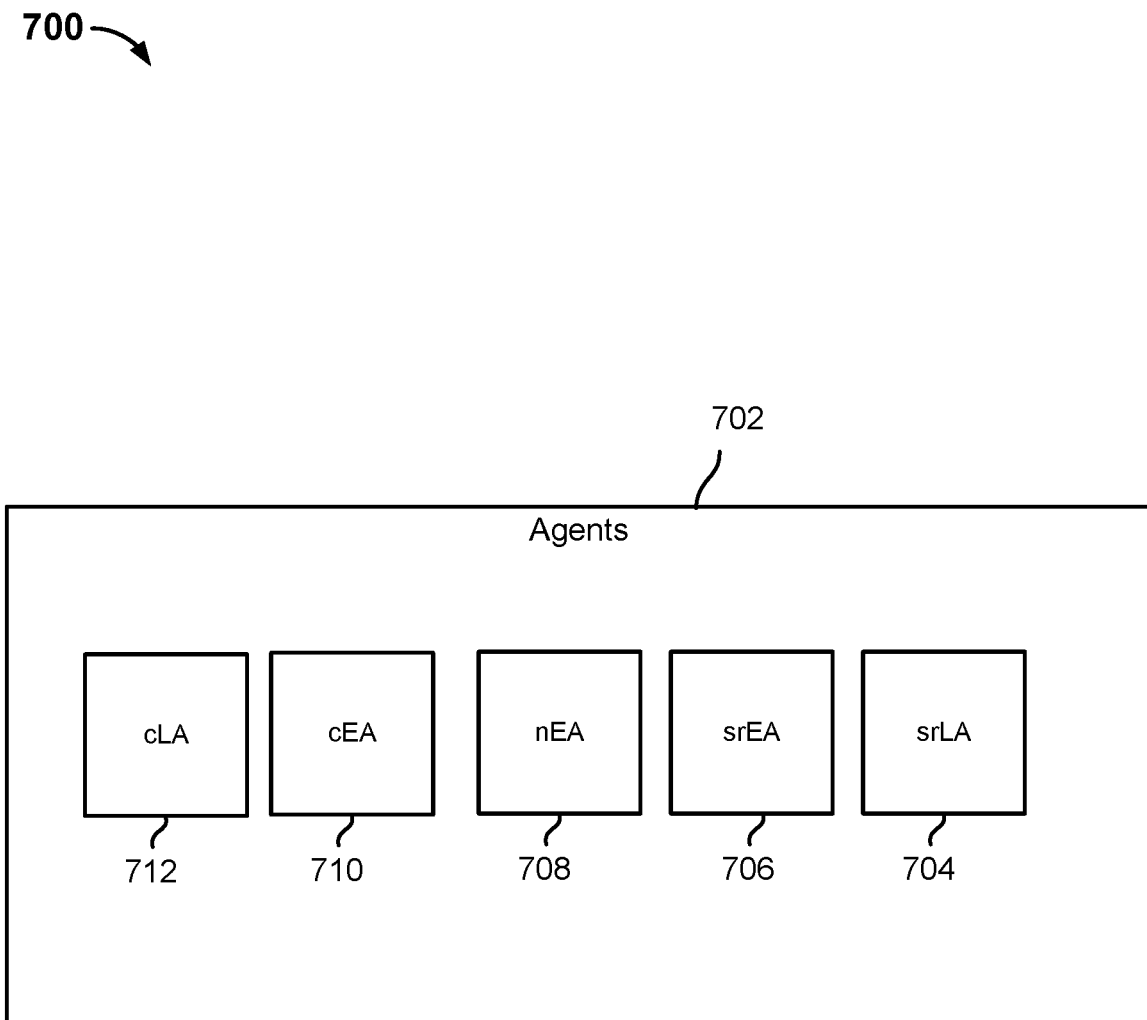
FIG. 7 is a block diagram illustrating an embodiment of an agent.

FIG. 7 is a block diagram illustrating an embodiment of an agent. In the example shown, agent 700 can be performed by an agent, such as one of the one or more agents 120.

Agent 702 can include a service routing lookup agent (srLA) 704, a service routing enforcement agent (srEA) 706, a network enforcement agent (nEA) 708, a cryptography enforcement agent (cEA) 710, and a cryptography lookup agent (cLA) 712. In some embodiments, srEA 706, nEA 708, and cEA 710 can be combined into a single enforcement agent. In some embodiments, srLA 704 and cLA 712 can be combined into a single lookup agent. In other embodiments, srLA 704, srEA 706, nEA 708, cEA 710, and cLA 712 can be combined into a single agent. In some embodiments, the enforcement agents can be implemented in a Linux kernel or user-space.

srLA 704 can be configured to determine metadata attached to a workload and to determine one or more policies associated with the attached metadata. srLA 704 can be configured to calculate and install one or more rules (e.g., load balancing, access control, URL rewrite, encryption, etc.) in srEA 704 to enforce the one or more determined policies. srLA 704 can be configured to install policy routing rules in nEA 708 to ensure that traffic that matches one or more service routing policies is directed to srEA 706. In the event a workload is removed from a service routing policy, srLA 704 is configured to remove the related rules installed in srEA 706.

srEA 706 can be configured to enforce one or more policies associated with one or more installed rules. srEA 706 can be configured to communicate with one or more srLAs to obtain a current state of the infrastructure. srEA 706 can be configured to forward a traffic flow to/from the workload. srEA 706 can be configured to install one or more flow rules in nEA 708 to cut-through (e.g., inspect first packet of traffic, allow other data packets to pass through) further traffic. srEA 706 can be configured to tear down flow rules installed in nEA 708 based on changes made to the infrastructure (e.g., workload is destroyed). srEA 706 can be configured to provide to one or more srLAs performance information associated with a session (e.g., latency, throughput, jitter, lost packets, etc.), which a srLA can use to make further routing decisions. The performance information can also be used to record performance data for later analysis and monitoring.

nEA 708 can be configured to route traffic that matches one or more service routing policies to srEA 708. For example, nEA 708 determines whether a networking layer (layers 3 and 4) is compatible with a service routing layer (layers 5-7). nEA 708 can determine whether a network policy allows a workload to communicate with an endpoint when a service routing policy indicates that the workload is able to communicate with the endpoint. If a network policy does not match a service routing policy, then even though a service routing policy may indicate that a workload can communicate with an endpoint, the network policy may prevent the communication between the workload and the endpoint.

When a workload attempts a communication that is covered by a PG, cEA 710 is configured to attempt to setup an encrypted (or other) channel for the communication using the relevant certificate associated with the policy group. In some embodiments, if the policy requires, cEA 710 is configured to evaluate the certificate presented by the far-end (e.g., a remote endpoint, a sending endpoint) and insure that the certificate is signed by the correct PG CA and the certificate is still valid. cEA 710 is configured to install necessary transient return traffic rules to allow for the correct handling of encrypted and/or signed return traffic. In some embodiments, if all requirements are met, cEA 710 is configured to encrypt, decrypt, sign, validate, etc. the traffic for the session. This is done by whatever encryption framework (TLS, PGP, IPSec, PSK, etc.) is requested in the policy.

When a workload is presented to a server by an orchestrator/scheduler or similar mechanism, cLA 712 is configured to evaluate the workload metadata and determine which, if any, policy groups apply to the workload. For each PG that matches, cLA 712 is configured to generate a certificate associated with PG. cLA 712 is configured to send the certificate associated with the PG to the public key infrastructure (PKI) for signature by an iCA associated with the PG. The PKI is configured to enroll the certificate associated with the PG in the secure distribution mechanism (SDM) as a valid signature. cLA 712 is configured to install the certificate associated with the policy group into cEA 710 that is associated with the workload. cLA is further configured to install one or more necessary policies for a PG into cEA 710 (and other enforcement agents, if necessary) to enable the required encryption. cLA 712 is configured to install the necessary, if any, policy routing rules in nEA 708. When a workload is removed from a PG, (e.g., due to metadata change, destruction of the workload, change in policy, etc.) cLA 712 is configured to invalidate the certificate associated with the PG and remove the certificate associated with the PG from a valid certificate list in the SDM. cLA 712 is configured to record the certificate associated with the PG in an invalid certificate list in the SDM.

Figure 8A:
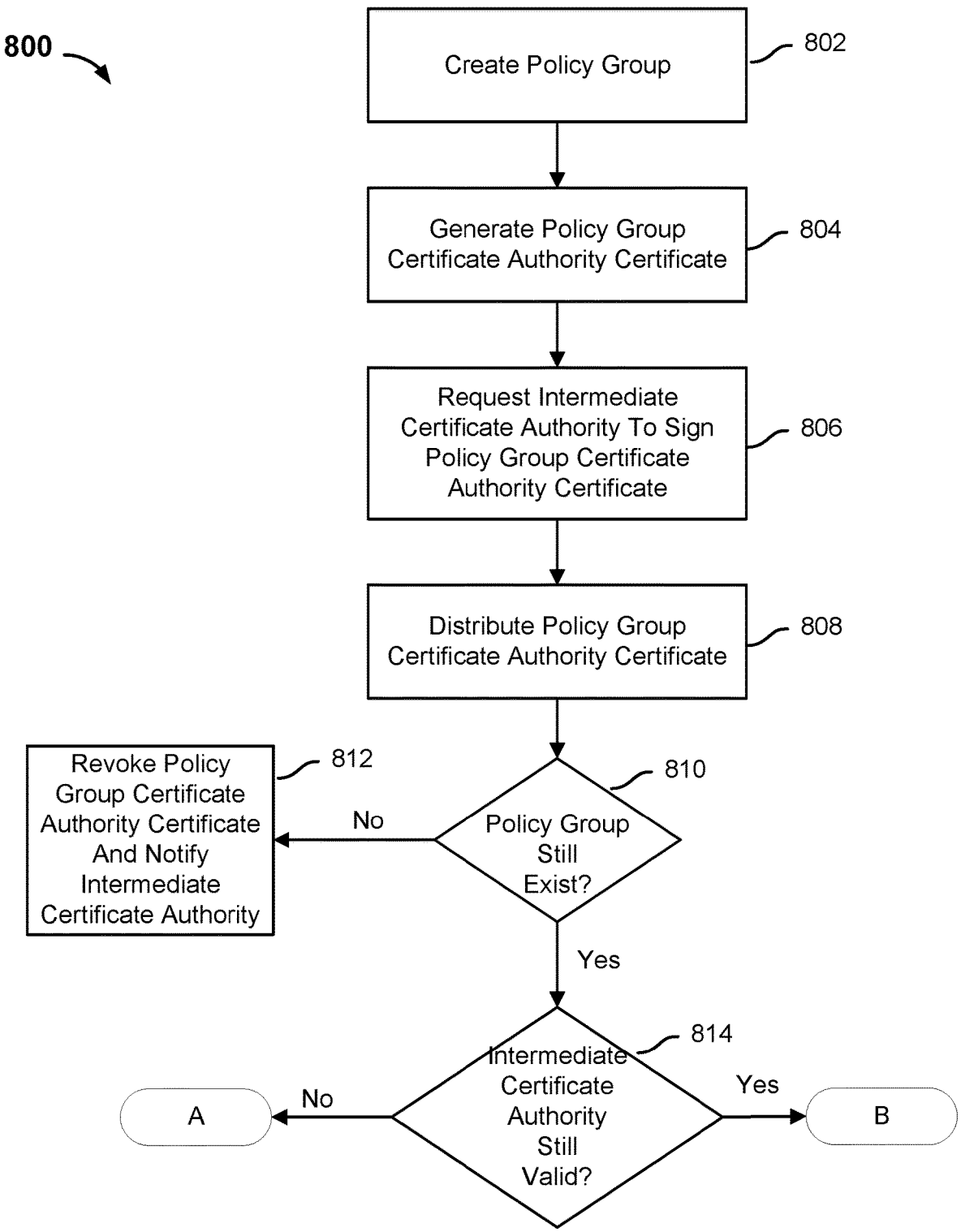
FIGS. 8A, 8B, and 8C are flowcharts illustrating an embodiment of a process for maintaining a policy group.
Figure 8B:
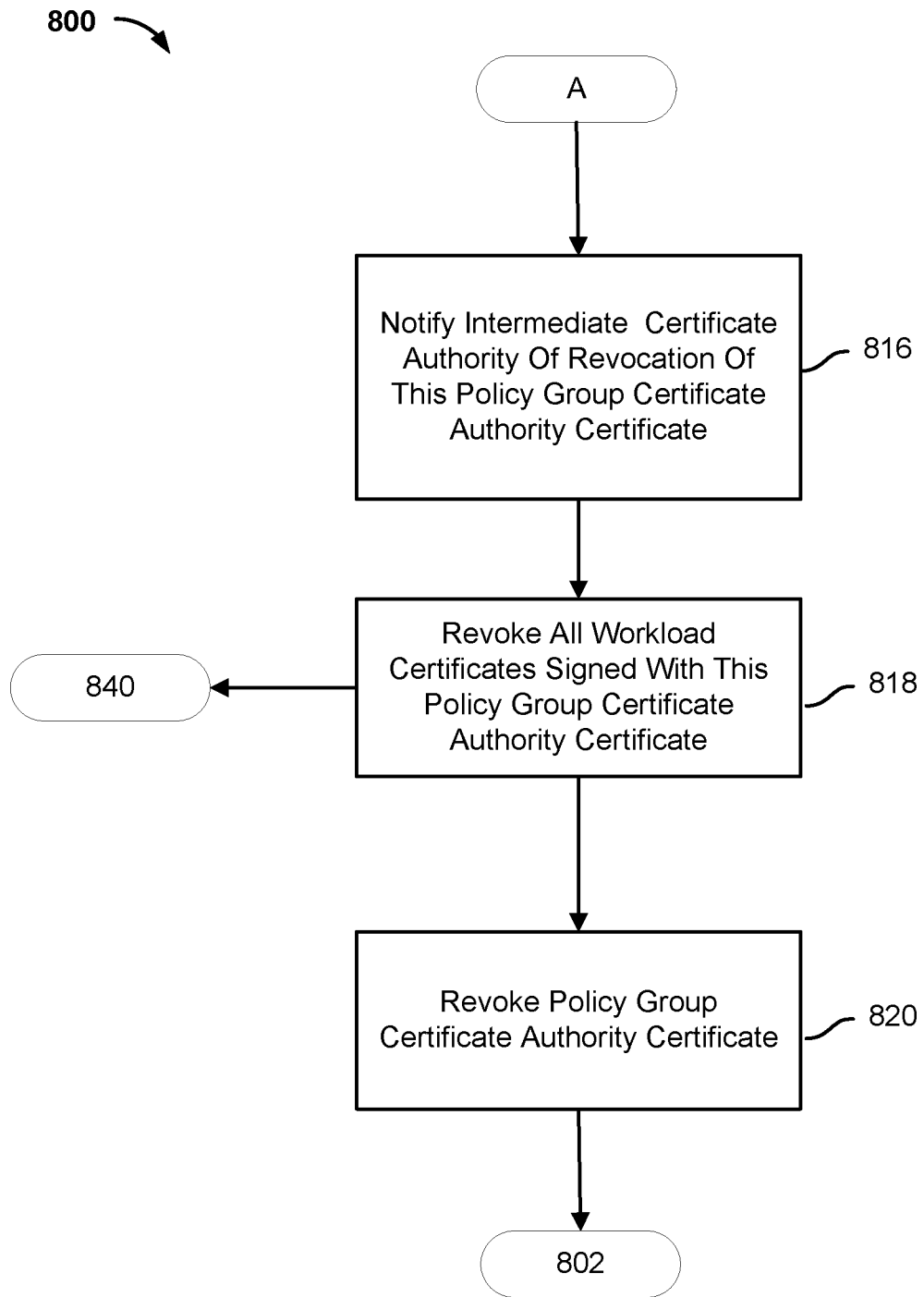
Figure 8C:
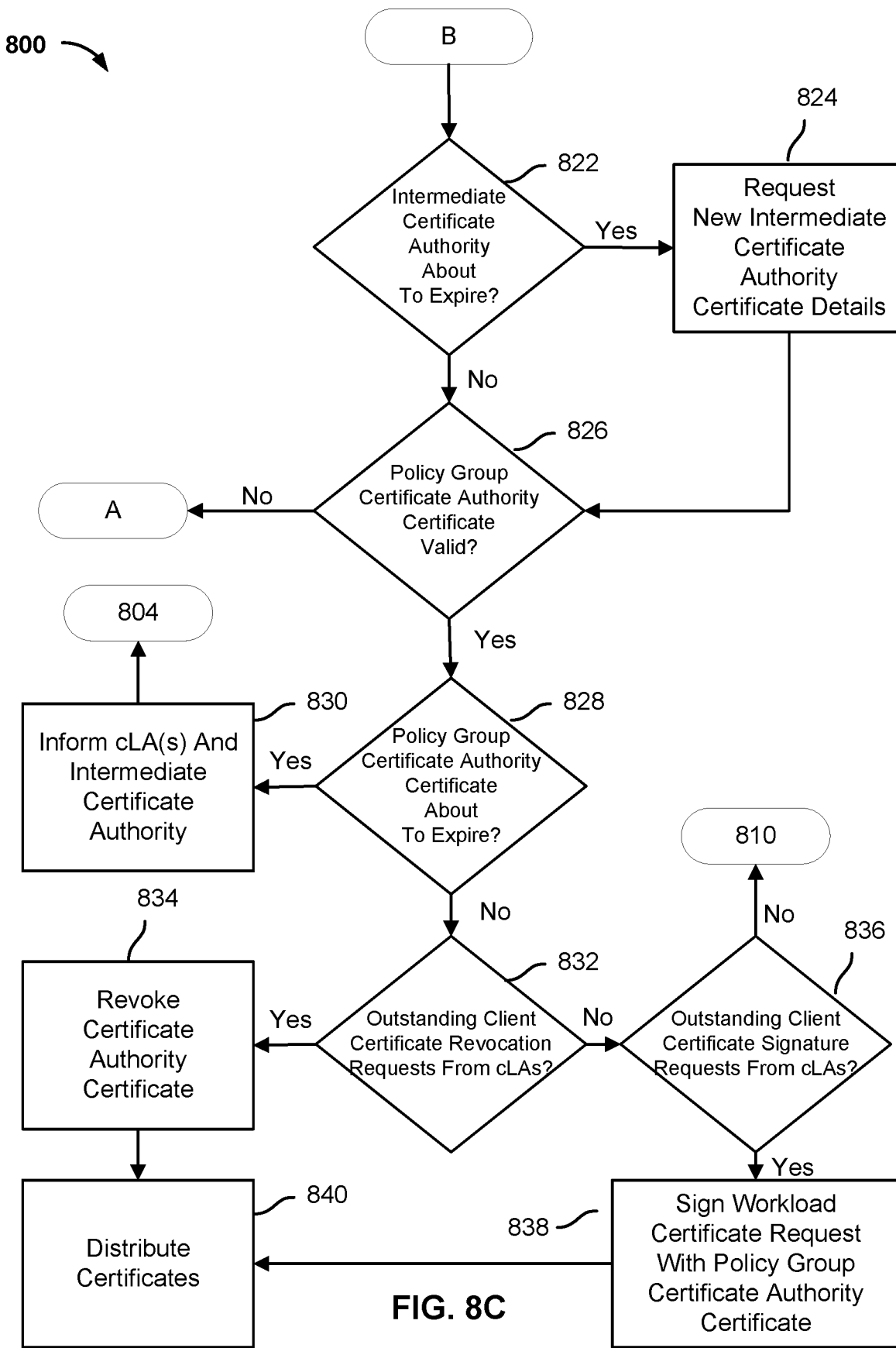

FIGS. 8A, 8B, and 8C are flowcharts illustrating an embodiment of a process for maintaining a policy group. In the example shown, process 800 can be performed by one or more agents, such as one or more agents 120. Process 800 can also be performed by one or more agents external to a server. Process 800 can also be performed by a combination of one or more agents internal to a server and one or more agents external to the server.

At 802, a PG is created. In some embodiments, a PG is created by an orchestrator. The PG is comprised of one or more policies. Each policy is associated with one or more instances of metadata attached to a workload. For example, a PG may be associated with a "dB client" policy, a "dB_server" policy, and a "dB API" policy. The "dB client" policy, "dB_server" policy, and "dB API" policy are associated with corresponding metadata. If a workload has the corresponding metadata attached to it, then the workload is part of the PG. If the workload is missing at least one instance of the corresponding metadata of the PG (e.g., the workload does not have the metadata associated with the "dB API" attached to it), then the workload is not part of/no longer part of the PG.

At 804, a PG certificate authority (CA) certificate is generated. The PG CA certificate is specific to the PG. For example, a first PG CA certificate can be generated for a first PG and a second PG CA certificate can be generated for a second PG. In some embodiments, the PG CA certificate is generated by an agent associated with a workload that is part of the PG.

At 806, a request is provided to an iCA to sign the PG CA certificate. There can be a plurality of iCAs. Each iCA is associated with a specific PG. The PG CA certificate can be provided to an iCA that is specific to the PG.

At 808, the signed PG CA certificate is distributed to one or more proxies associated with a workload. A proxy can be configured to receive traffic from a workload associated with a PG and to encrypt the traffic from the workload associated with the PG using the signed PG CA certificate.

At 810, it is determined whether the PG still exists. In some embodiments, an orchestrator determines whether the PG still exists. In some embodiments, an agent associated with a workload determines whether the PG still exists. In other embodiments, a proxy associated with the workload determines whether the PG still exists. In other embodiments, an agent configured to determine whether the PG still exists determines whether the PG still exists. The agent can be a stand-alone agent or part of another component in a server or orchestrator.

In the event the PG does not still exist, process 800 proceeds to 812 where the PG CA certificate for that specific PG is revoked and the iCA associated with that specific PG is notified. In the event the PG does still exist, the process 800 proceeds to 814 where it is determined if the intermediate CA is still valid. For example, the intermediate CA may be found invalid if it has been replaced, has failed, found to be untrustworthy, etc.

In the event the iCA is not still valid, process 800 proceeds to 816. In the event the upstream CA is still valid, process 800 proceeds to 822.

At 816, the iCA is notified or the PG CA certificate is revoked. The PG CA certificate is added to a certificate revocation list (CRL) and the CRL is distributed.

At 818, all workload certificates signed with this PG CA certificate is revoked.

At 820, the PG CA certificate is revoked.

At 822, it is determined whether the iCA is about to expire. The iCA can have a lifetime of minutes, hours, days, weeks, months, etc. In the event the iCA is about to expire, process 800 proceeds to 824 where the certificate details associated with a new iCA are requested. In the event the iCA is not about to expire, process 800 proceeds to 826 where it is determined whether the PG CA certificate is valid. In some embodiments, an orchestrator determines if that PG CA certificate is valid. In other embodiments, an agent associated with a workload determines if the PG CA certificate is valid. In other embodiments, a proxy associated with a workload determines if the PG certificate valid. A PG CA certificate may be invalid if an expiration date associated with the PG CA certificate has expired, the workload with which the PG CA certificate is associated is no longer a member of the PG, the workload has become untrusted, the workload has been terminated, etc.

In the event the PG CA certificate is not valid, process 800 proceeds to 816. In the event the PG CA certificate is valid, process 800 proceeds to 828 where it is determined whether the PG CA certificate is about to expire. In the event the PG CA certificate is about to expire, process 800 proceeds to 830 where the cLA(s) and iCA for that PG are informed that the PG CA certificate is about to expire. In the event the PG CA certificate is not about to expire, process 800 proceeds to 832 where it is determined whether there are any outstanding client certificate revocation requests from any cLA. In some embodiments, an agent configured to determine whether there are any outstanding client certification revocation requests from any cLA determines whether there are any outstanding client certification revocation requests from any cLA. The agent may be part of the public key infrastructure (PKI), stand alone, or otherwise incorporated into other services. In the event there are at least one outstanding client certificate revocation request, process 800 proceeds to 834 and the CA certificate associated with the outstanding client certificate revocation request is revoked. The CA certificate associated with the outstanding client certificate revocation request is added to a CRL and the process proceeds to 840. In the event there are no outstanding certificate revocation requests, process 800 proceeds to 836.

At 836, it is determined whether there are any outstanding client certificate signature requests from any cLAs. In some embodiments, an agent configured to determine whether there are any outstanding client certificate signature requests from any cLA determines whether there are any outstanding client certification signature requests from any cLA. The agent may be part of the public key infrastructure (PKI), stand alone, or otherwise incorporated into other services. In the event there are no outstanding client certificate requests from any cLA, process 800 proceeds to 810. In the event there is at least one outstanding client certificate request, process 800 proceeds to 838.

At 838, a workload certificate request is signed with the PG CA certificate. In some embodiments, the workload certificate request is signed by the PKI.

At 840, the certificates and/or the CRL(s) are distributed to one or more proxies associated with the workload.

Figure 9:
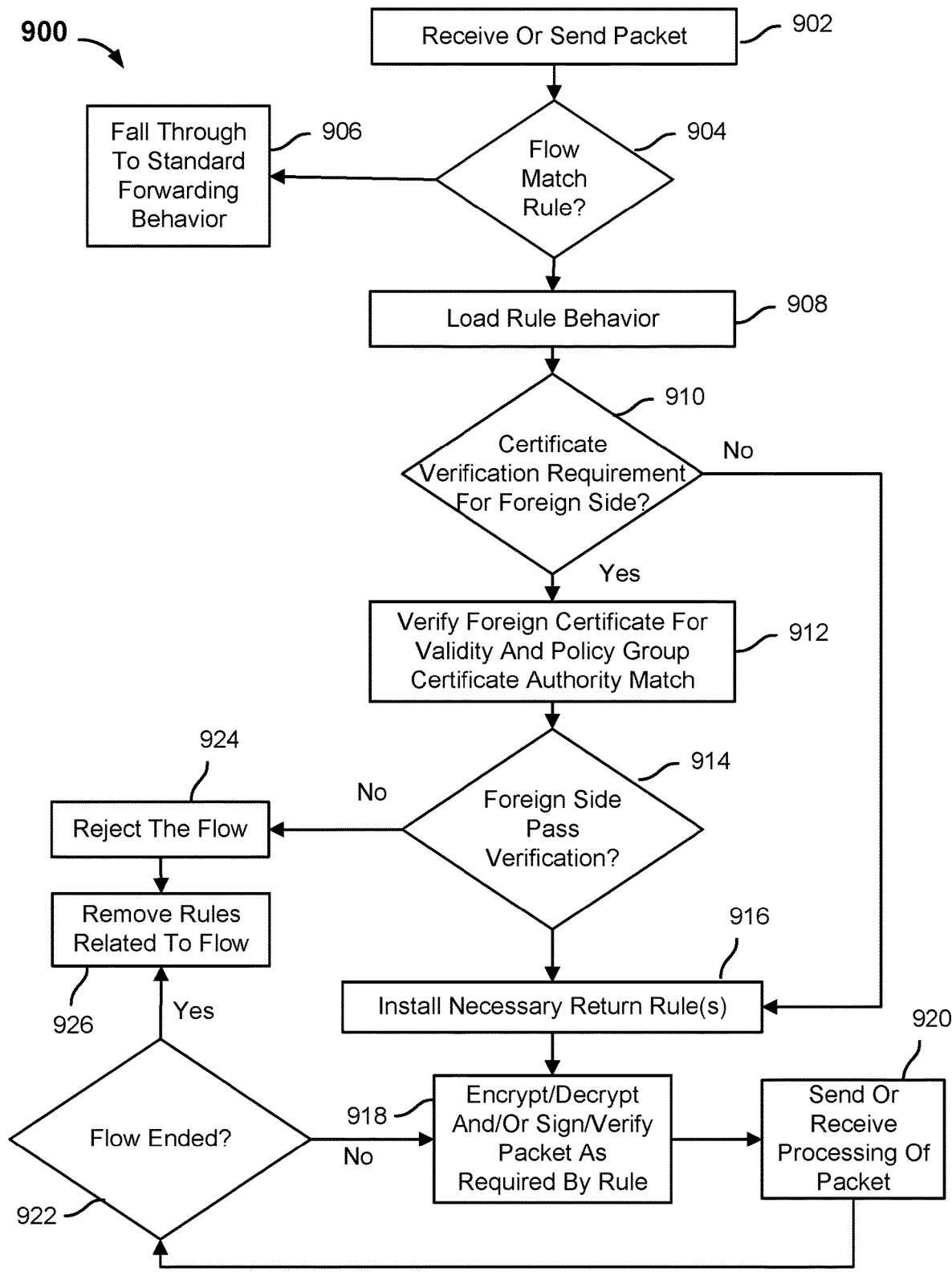
FIG. 9 is a flowchart illustrating an embodiment of a process for maintaining cryptography policies.

FIG. 9 is a flowchart illustrating an embodiment of a process for maintaining cryptography policies. In the example shown, process 900 can be performed by one or more agents, such as one or more agents 120. Process 900 can also be performed by one or more agents external to a server. Process 900 can also be performed by a combination of one or more agents internal to a server and one or more agents external to the server.

At 902, a packet is sent or received. For example, the packet is sent by or received at a workload associated with a proxy.

At 904, it is determined whether the flow matches a rule. A flow can comprise one or more data packets. The one or more data packets may be received from a workload that is part of a PG. A PG may have one or more rules with which it is associated. For example, a PG may require that traffic associated with a workload be encrypted with a certificate that is signed by a iCA associated with the PG. In some embodiments, it is determined whether the one or more data packets are associated with a particular PG.

In the event the flow does not match rule, process 900 proceeds to 906 where packets are forwarded using standard forwarding behavior." (i.e., not through a proxy). For example, the flow comprised of one or more data packets may not be associated with a PG and thus does not need to be encrypted using a certificate signed by an iCA associated with a PG. In that instance, the flow does not need to be encrypted.

In the event the flow matches a rule, process 900 proceeds to 908 and the rule behavior is loaded. For example, cryptographic behavior using the certificate(s) is loaded.

At 910, it is determined whether there is a certificate verification requirement for a foreign/remote side. In the event there is no certificate verification requirement, then process 900 proceeds to 916. In the event there is a certificate verification requirement, then process 900 proceeds to 912 and the foreign certificate is verified for validity and PG CA match.

At 914, it is determined if the foreign side passed verification. In the event the foreign side did not pass verification, process 900 proceeds to 924 and the flow is rejected. In the event the foreign side did pass verification, process 900 proceeds to 916.

At 916, one or more necessary return rules are installed. For example, a return rule may require that return traffic is to be encrypted or signed by a key associated with a valid certificate signed by an iCA associated with the corresponding PG.

At 918, the packet is encrypted/decrypted and/or signed/verified as required by the rule.

At 920, the process of packet is sent or received.

At 922, it is determined whether the flow has ended. In the event the flow has ended, process 900 proceeds to 926 and the rules related to the flow are removed. In the event the flow has not ended, process 900 proceeds to 918.

Figure 10A:
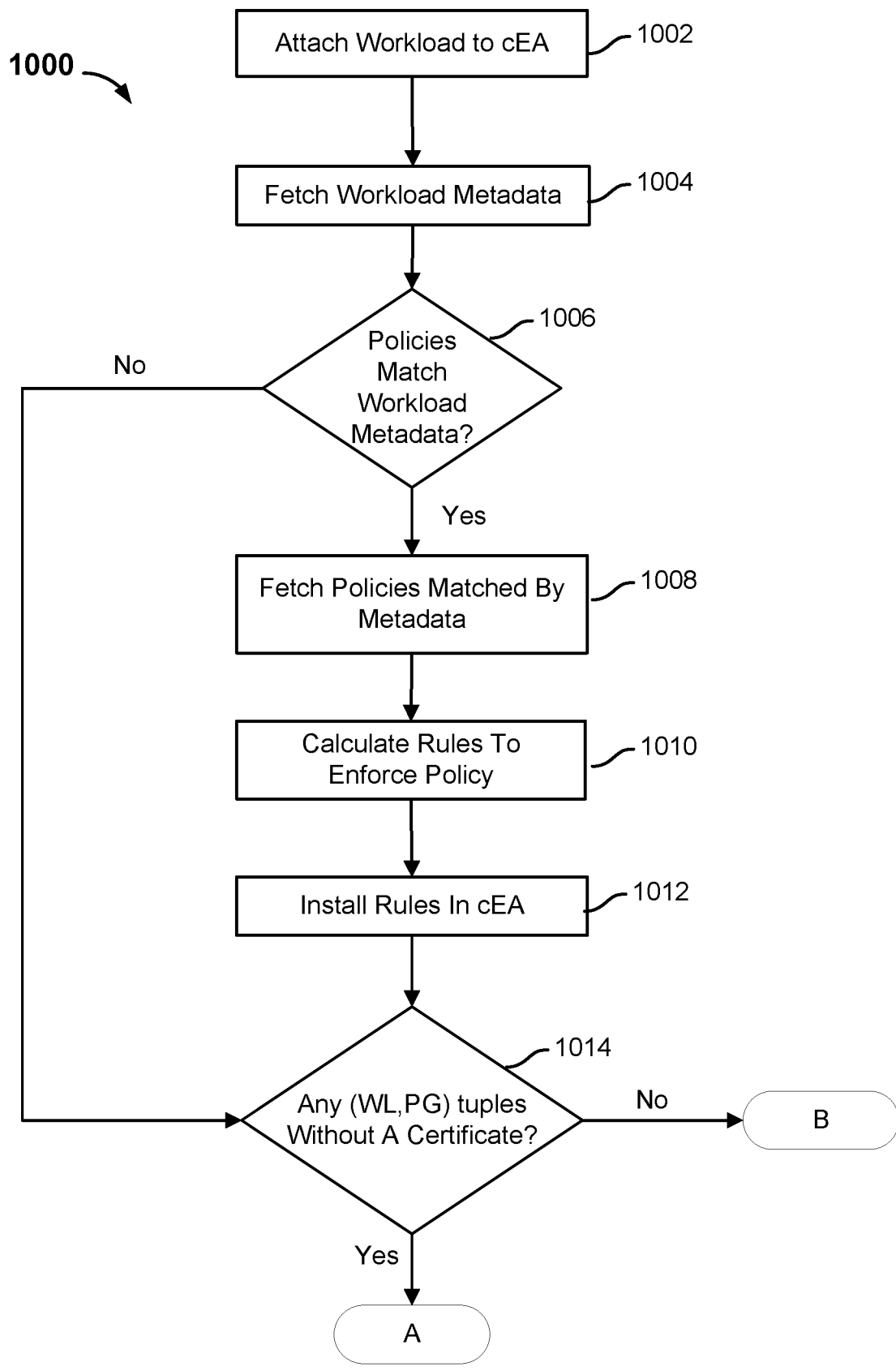
FIGS. 10A, 10B, and 10C are flowcharts illustrating an embodiment for establishing cryptography for a workload.
Figure 10B:
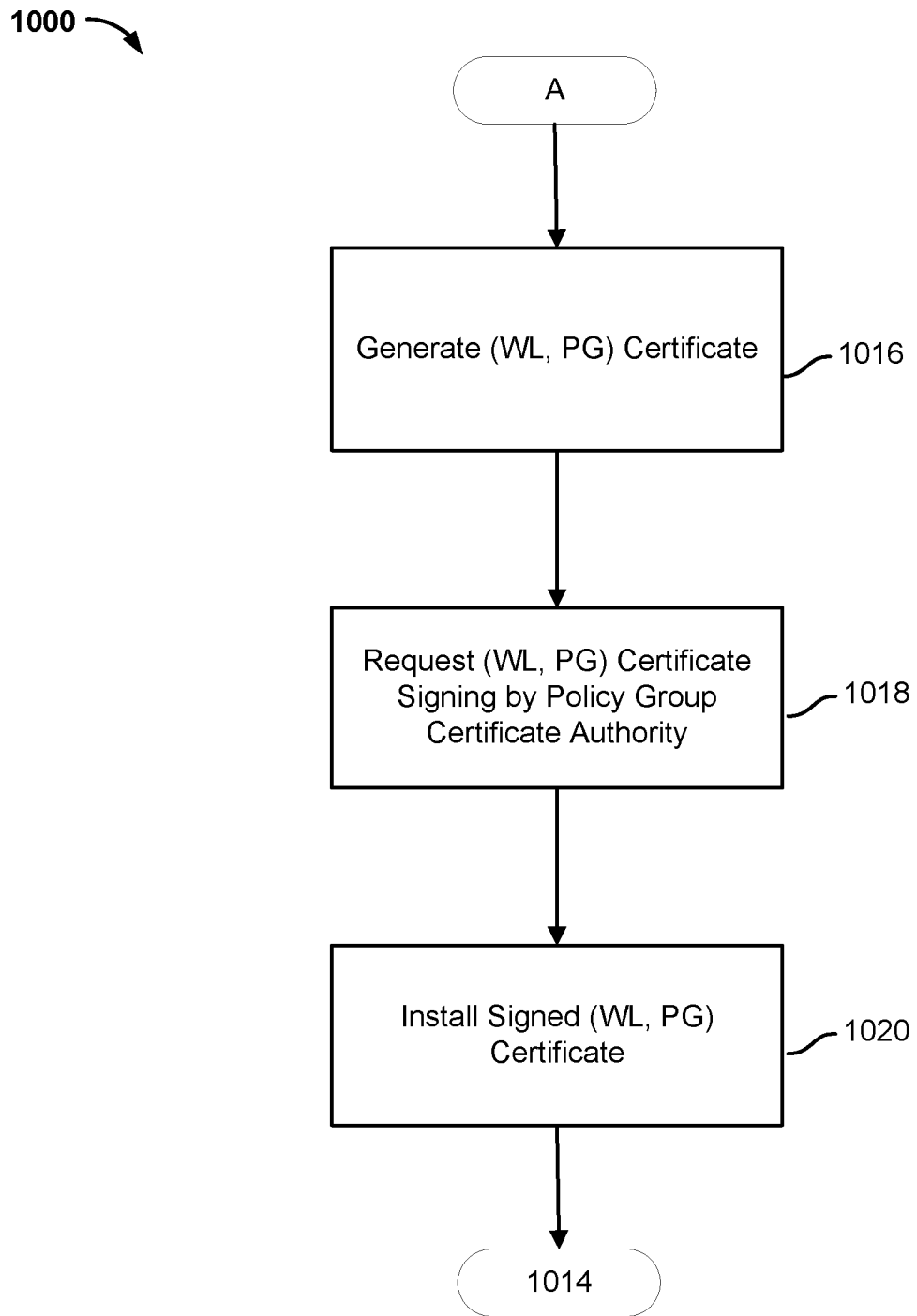
Figure 10C:
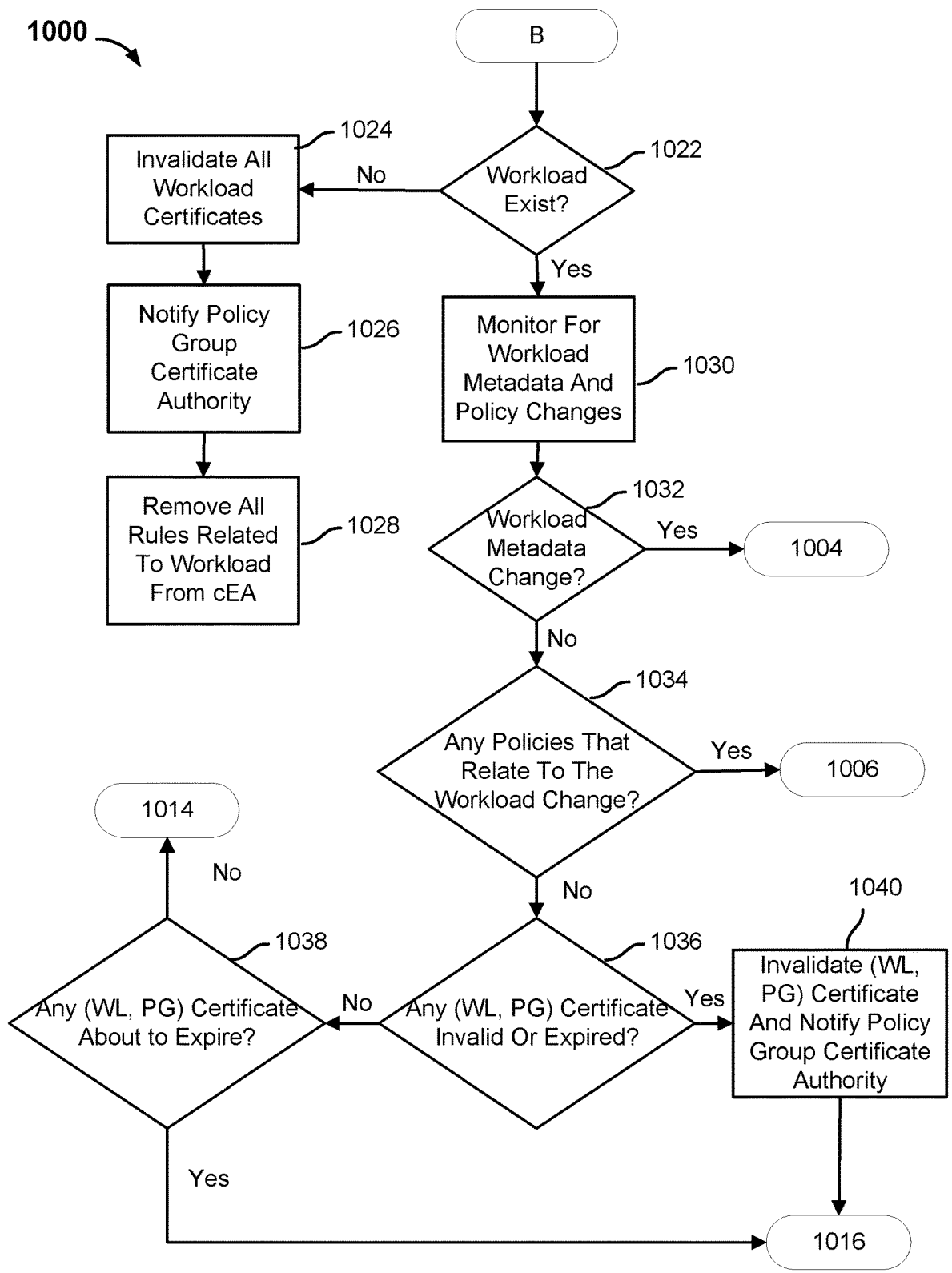

FIGS. 10A, 10B, and 10C are flowcharts illustrating an embodiment for establishing cryptography for a workload. In the example shown, process 600 can be performed by an agent, such as one of the one or more agents 120.

At 1002, a workload is attached to a cEA. When a workload attempts a communication that is covered by a PG, a cEA can be configured to attempt to setup an encrypted (or other) channel for the communication using the relevant certificate associated with the policy group.

At 1004, workload metadata is fetched. The workload metadata is attached to a workload and can be fetched by an agent, such as a srLA or a cLA.

At 1006, it is determined whether the policies match workload metadata. A srLA or cLA can be configured to evaluate the workload metadata and determine which, if any, PGs apply to the workload based on the workload metadata. In the event the policies match the workload metadata, process 1000 proceeds to 1008 where the policies that match the metadata are fetched. In the event the policies do not match the workload metadata, process 100 proceeds to 1014.

At 1010, one or more rules to enforce the policy are calculated. For example, a rule can be that traffic associated with a workload is to be encrypted.

At 1012, the one or more rules are installed in the cEA. The cEA can be configured to evaluate the certificate and insure that the certificate is signed by the correct PG CA and that the certificate is still valid.

At 1014, it is determined whether any (WL, PG) tuples are without a certificate. For example, a workload may be part of a plurality of PGs and one of (wl, pg) tuples does not include a certificate.

In the event there is at least one (WL, PG) tuples without a certificate, process 1000 proceeds to 1016. In the event there are no (WL, PG) tuples without a certificate, process 100 proceeds to 1022.

At 1016, a (WL, PG) certificate is generated for the (WL, PG) tuple without a certificate.

At 1018, it is requested that the (WL, PG) certificate is to be signed by a PG CA. For example, the cEA can request an iCA associated with the PG to sign the (WL, PG) certificate.

At 1020, the signed (WL, PG) certificate signed by the iCA associated with the PG is installed in a proxy associated with a workload.

At 1022, it is determined whether a workload exists. In the event a workload does not exist, then process 1000 proceeds to 1024 where all certificates associated with that workload are invalidated. In the event a workload does still exist, then process 1000 proceeds to 1030.

At 1026, a PG CA associated with the workload is notified that the workload no longer exists. At 1028, the one or more rules associated with the workload that no longer exists are removed from the cEA.

At 1030, workload metadata and policy changes associated with the workload are monitored. For example, an agent on the host server may monitor the workload metadata and policy changes associated with the workload.

At 1032, it is determined whether the workload metadata has changed. For example, a key value pair of a workload may have changed from "role: development" to "role: production." In the event the workload metadata has changed, process 1000 proceeds to 1004. In the event the workload metadata has not changed, process 1000 proceeds to 1034.

At 1034, it is determined if any policies related to the workload have changed. In the event at least one of the policies related to the workload has changed, process 1000 proceeds to 1006. In the event none of the policies related to the workload have changed, process 1000 proceeds to 1036.

At 1036, it is determined whether any (WL, PG) certificate is invalid or expired. In the event a (WL, PG) certificate is invalid or expired, process 1000 proceeds to 1040. In the event a (WL, PG) certificate is not invalid or has not expired, process 1000 proceeds to 1038.

At 1038, it is determined whether any (WL, PG) certificate is about to expire (e.g., within a threshold expiration duration). In the event the (WL, PG) certificate is about to expire, process 1000 proceeds to 1016. In the event the (WL, PG) certificate is not about to expire, process 100 proceeds to 1014.

At 1040, the (WL, PG) certificate is invalidated and the PG CA associated with the workload is notified of the invalid certificate.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving from an endpoint at a proxy associated with a server one or more data packets intended for a workload running on the server;
determining, by the proxy associated with the server, whether the one or more data packets intended for the workload are encrypted with a certificate associated with a policy group that includes the workload, wherein the certificate is generated by an agent and signed by a certificate authority specific to the policy group; and
providing the one or more data packets to the workload based on whether the one or more data packets intended for the workload are encrypted with a certificate associated with a policy group that includes the workload.

2. The method of claim 1, wherein the certificate associated with the policy group is directly signed by an intermediate certificate authority specific to the policy group.

3. The method of claim 1, wherein the certificate associated with the policy group is indirectly signed by an intermediate certificate authority specific to the policy group.

4. The method of claim 1, wherein the certificate associated with the policy group is signed by an intermediate certificate authority that is part of a chain of intermediate certificate authorities.

5. The method of claim 1, wherein in response to determining that the one or more data packets intended for the workload are not encrypted with the certificate associated with the policy group, the one or data packets are not provided to the workload.

6. The method of claim 5, wherein the one or more data packets intended for the workload are encrypted with an invalid certificate.

7. The method of claim 5, wherein the one or more data packets intended for the workload are encrypted with a certificate directly signed by an intermediate certificate authority associated with a different policy group.

8. The method of claim 5, wherein the one or more data packets intended for the workload are encrypted with a certificate indirectly signed by an intermediate certificate authority associated with a different policy group.

9. The method of claim 1, wherein in response to determining that the one or more data packets intended for the workload are encrypted with the certificate associated with the policy group, the one or data packets are provided to the workload.

10. The method of claim 1, wherein the workload is determined to be part of the policy group based on metadata attached to the workload.

11. The method of claim 1, wherein the certificate associated with the policy group is signed by intermediate certificate authority that generated by an orchestrator.

12. The method of claim 11, wherein the intermediate certificate authority is generated by an orchestrator in response to creating the policy group.

13. A system, comprising:
a processor; and
a memory coupled with the processor, wherein the memory is configured to provide the processor with instructions which when executed cause the processor to:
receive from an endpoint at a proxy associated with a server one or more data packets intended for a workload running on the server;
determine, by the proxy associated with the server, whether the one or more data packets intended for the workload are encrypted with a certificate associated with a policy group that includes the workload, wherein the certificate is generated by an agent and signed by a certificate authority specific to the policy group; and provide the one or more data packets to the workload based on whether the one or more data packets intended for the workload are encrypted with a certificate associated with a policy group that includes the workload.

14. The system of claim 13, wherein the certificate associated with the policy group is directly signed by an intermediate certificate authority specific to the policy group.

15. The system of claim 13, wherein the certificate associated with the policy group is indirectly signed by an intermediate certificate authority specific to the policy group.

16. The system of claim 13, wherein the certificate associated with the policy group is signed by an intermediate certificate authority that is part of a change of intermediate certificate authorities.

17. The system of claim 13, wherein in response to a determination that the one or more data packets intended for the workload are not encrypted with the certificate associated with the policy group, the one or data packets are not provided to the workload.

18. The system of claim 13, wherein in response to a determination that the one or more data packets intended for the workload are encrypted with the certificate associated with the policy group, the one or data packets are provided to the workload.

19. The system of claim 13, wherein the workload is determined to be part of the policy group based on metadata attached to the workload.

20. A computer program product, the computer program product being embodied in a non-transitory computer readable storage medium and comprising computer instructions for:
  receiving from an endpoint at a proxy associated with a server one or more data packets intended for a workload running on the server;
  determining, by the proxy associated with the server, whether the one or more data packets intended for the workload are encrypted with a certificate associated with a policy group that includes the workload, wherein the certificate is generated by an agent and signed by a certificate authority specific to the policy group; and
  providing the one or more data packets to the workload based on whether the one or more data packets intended for the workload are encrypted with a certificate associated with a policy group that includes the workload.

\* \* \* \* \*

UNITED STATES PATENT AND TRADEMARK OFFICE
CERTIFICATE OF CORRECTION

PATENT NO. : 11,290,284 B2
APPLICATION NO. : 16/717893
DATED : March 29, 2022
INVENTOR(S) : Christopher David Liljenstolpe It is certified that error appears in the above-identified patent and that said Letters Patent is hereby corrected as shown below:

In the Claims

In Column 16, Line(s) 25, Claim 5, after "one or", insert --more--.
In Column 16, Line(s) 41, Claim 9, after "one or", insert --more--.
In Column 17, Line(s) 21, Claim 17, after "one or", insert --more--.
In Column 18, Line(s) 2, Claim 18, after "one or", insert --more--.

Signed and Sealed this
Twenty-first Day of March, 2023

Katherine Kelly Vidal
*Director of the United States Patent and Trademark Office*